United States Patent
Lerner (10) Patent No.: US 8,239,442 B2
(45) Date of Patent: Aug. 7, 2012

(54) COMPUTING MODULE FOR EFFICIENT FFT AND FIR HARDWARE ACCELERATOR

(75) Inventor: Boris Lerner, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 1034 days.

(21) Appl. No.: 12/188,634

(22) Filed: Aug. 8, 2008

(65) Prior Publication Data

US 2010/0036898 A1    Feb. 11, 2010

(51) Int. Cl.
*G06F 15/00* (2006.01)
*G06F 7/52* (2006.01)

(52) U.S. Cl. .................. 708/603; 708/409; 708/622

(58) Field of Classification Search .............. 708/505, 708/603, 409, 511, 523, 622
See application file for complete search history.

(56) References Cited

U.S. PATENT DOCUMENTS

| | | | | |
|---|---|---|---|---|
| 6,385,634 | B1 * | 5/2002 | Peleg et al. ............. | 708/490 |
| 7,127,482 | B2 * | 10/2006 | Hou et al. ............... | 708/402 |
| 7,216,139 | B2 * | 5/2007 | Langhammer et al. ..... | 708/501 |
| 7,346,644 | B1 * | 3/2008 | Langhammer et al. ..... | 708/625 |
| 7,685,405 | B1 * | 3/2010 | Chow et al. ............. | 712/35 |

FOREIGN PATENT DOCUMENTS

EP    1758030    2/2007

OTHER PUBLICATIONS

Lange et al., "Reconfigurable Multiply-Accumulate-Based Processing Element," Proceedings of the 2002 Workshop on Heterogeneous Systems on a Chip, pp. 1-4 (Jan. 1, 2002).
Xie et al., "Design on Operator-Based Reconfigurable Hardware Architecture and Cell Circuit," Evolvable Systems: From Biology to Hardware, pp. 140-150 (Sep. 21, 2007).
Hong et al., "Domain Specific Reconfigurable Processing Core Architecture for Digital Filtering Applications," Journal of VLSI Signal Processing, vol. 40, No. 2, pp. 239-259 (Jun. 1, 2005).
International Search Report and Written Opinion mailed Feb. 11, 2011 for International Application No. PCT/US2009/004460 (15 pages).
International Preliminary Report on Patentability mailed Feb. 22, 2011 for International Application No. PCT/US2009/004460 (12 pages).

* cited by examiner

*Primary Examiner* — Chuong D Ngo
(74) *Attorney, Agent, or Firm* — Bingham McCutchen LLP (57) ABSTRACT

A hardware accelerator operable in an FFT mode and an FIR mode. The hardware accelerator takes input data and coefficient data and performs the calculations for the selected mode. In the FFT mode, a rate-two FFT is calculated, producing four real outputs corresponding to two complex numbers. In the FIR mode, one real output is generated. The hardware accelerator may switch from FFT mode to FIR mode using three multiplexers. All FIR components may be utilized in FFT mode. Registers may be added to provide pipelining support. The hardware accelerator may support multiple numerical-representation systems.

10 Claims, 5 Drawing Sheets

COMPUTING MODULE FOR EFFICIENT FFT AND FIR HARDWARE ACCELERATOR

FIELD OF INVENTION

This invention relates to an accelerator for calculating FFT and FIR values

BACKGROUND

Solutions to the fast Fourier transform (FFT) and finite impulse response (FIR) algorithms are required for signal processing in numerous engineering applications. Applications of both the FFT and FIR algorithms are abundantly described in the engineering literature.

The FFT is an algorithm for calculating the Discrete Fourier Transform (DFT) and its inverse.

An FIR filter is a type of a digital filter whose impulse response fades to zero after a sufficiently long time.

Increased efficiency in calculating FFT and FIR values is a constantly present goal for designers of signal processing systems.

SUMMARY

A computing module for an efficient hardware accelerator for generating both FFT and FIR values is described. The hardware accelerator has inputs for receiving numeric values and a mode selector input for selecting the operating mode (i.e., FFT mode or FIR mode). The compute block is made up of a primary logic unit and a secondary logic unit. The primary logic unit outputs an FIR value when in the FIR operating mode and a first FFT value when in the FFT operating mode. The primary logic unit provides intermediate values to a secondary logic unit that outputs additional FFT values irrespective of the operating mode. In some embodiments, registers may be added to provide pipelining support. The hardware accelerator may support multiple numerical-representation systems.

In one aspect, a hardware accelerator comprises a plurality of numeric inputs, a primary logic unit and a secondary logic unit. The plurality of numeric inputs are for receiving numeric values. The primary logic unit is configured to output intermediate values and a first result, the first result determined by evaluating a first algebraic expression for the numeric values when a first mode signal is received and by evaluating a second algebraic expression when a second mode signal is received. The secondary logic unit is configured to output a second result determined by evaluating a third algebraic expression for the intermediate values.

In some embodiments of the hardware accelerator, the primary logic unit comprises a plurality of multiplexers, each multiplexer configured to select a first input when the first mode signal is received and to select a second input when the second mode signal is received. In some embodiments, the primary logic unit further comprises four multipliers and three adders.

In some embodiments, the numeric values comprises n–1 coefficient values $C_0, C_1, \ldots, C_{n-1}$, and n–1 data values $X_0, X_1, \ldots, X_{n-1}$, where n is a positive integer. When the first mode signal is received, the multipliers, adders, and numeric inputs are connected by the plurality of multiplexers to evaluate the first algebraic expression, the first algebraic expression being $C_0 X_0 + C_1 X_1 + C_2 X_2 + \ldots + C_{n-1} X_{n-1}$.

In some embodiments, when the second mode signal is received, the multipliers, adders and numeric inputs are connected by the plurality of multiplexers to evaluate the second algebraic expression, the second algebraic expression being $X_0 + C_0 X_2 + C_1 X_3$. In some embodiments, the intermediate values comprise a first intermediate value, $I_1$, where $I_1 = X_1$, and a second intermediate value, $I_2$, where $I_2 = C_2 X_2 + C_3 X_3$ and the secondary logic unit comprises a secondary adder for evaluating the third algebraic expression, the third algebraic expression being $I_1 + I_2$.

In some embodiments, the intermediate values comprise a third intermediate value, $I_3$, where $I_3 = X_0$, and a fourth intermediate value, $I_4$, where $I_4 = C_0 X_2 + C_1 X_3$. In some embodiments, the secondary logic unit further comprises a first subtractor to output a third result determined by evaluating a fourth algebraic expression for the intermediate values, the fourth algebraic expression being $I_3 - I_4$ and a second subtractor to output a fourth result determined by evaluating a fifth algebraic expression for the intermediate values, the fifth algebraic expression being $I_1 - I_2$.

In some embodiments of the hardware accelerator, the numeric values are encoded as floating point numbers.

In some embodiments of the hardware accelerator, the numeric values are encoded as fixed point numbers.

In some embodiments, the hardware accelerator further comprises a plurality of registers, the registers configured to enable pipelining.

In another aspect, a hardware accelerator comprises a mode selector input; a plurality of data inputs; a plurality of coefficient inputs; a first, second, and third multiplexer; a first, second, third, and fourth multiplier; a first, second, third, and fourth adder; and a first and second subtractor. The mode selector input provides a mode signal. The plurality of data inputs receive numeric data values, the plurality of data inputs comprising a first, second, third, and fourth data input. The plurality of coefficient inputs receive numeric coefficient values, the plurality of coefficient inputs comprising a first, second, third, and fourth coefficient input. The first multiplexer has a first multiplexer output for providing the numeric data value received from the first data input when the mode signal is in a first state, and the numeric data value received from the third data input when the mode signal is in a second state. The second multiplexer has a second multiplexer output for providing the numeric data value received from the second data input when the mode signal is in the first state, and the numeric data value received from the fourth data input when the mode signal is in the second state. The first multiplier has a first multiplier output for providing a first product, the first product being the product of the numeric coefficient value received from the first coefficient input and the numeric data value received from the first multiplexer output. The second multiplier has a second multiplier output for providing a second product, the second product being the product of the numeric coefficient value received from the third coefficient input and the numeric data value received from the third data input. The third multiplier has a third multiplier output for providing a third product, the third product being the product of the numeric coefficient value received from the second coefficient input and the numeric data value received from the second multiplexer output. The fourth multiplier has a fourth multiplier output for providing a fourth product, the fourth product being the product of the numeric coefficient value received from the fourth coefficient input and the numeric data value received from the fourth data input. The first adder has a first adder output for providing a first sum, the first sum being the sum of the first product received from the first multiplier and the third product received from the third multiplier. The second adder has a second adder output for providing a second sum, the second sum being the sum of the second product received from the second multiplier and the fourth product received from the fourth multiplier. The third multiplexer has a third multiplexer output for providing a third multiplexer output data, the third multiplexer output data being the second sum received from the second adder when the mode signal is in the first state, and the numeric data value received from the first data input when the mode signal is in the second state. The third adder having a first output for providing a first output data, the first output data being the sum of the third multiplexer output data received from the third multiplexer and the first sum received from the first adder. The fourth adder has a second output for providing a second output data, the second output data being the sum of the numeric data value received by the second data input and the second sum received from the second adder. The first subtractor has a third output for providing a third output data, the third output data being the difference of the numeric data value received by the first data input and the first sum received from the first adder. The second subtractor has a fourth output for providing a fourth output data, the fourth output data being the difference of the numeric data value received by the second data input and the second sum received from the second adder.

In some embodiments, the hardware accelerator further comprises a plurality of registers, wherein the plurality of registers are configured to enable pipelining.

In some embodiments, the hardware accelerator further comprises an encoding selector input configured to provide a signal specifying a numeric encoding mode. In some embodiments, the numeric encoding mode is selectable among at least a floating point number mode and a fixed point number mode.

In yet another aspect, a hardware accelerator comprises a plurality of numeric value inputs, a plurality of numeric coefficient inputs, a plurality of multiplexers, a plurality of multipliers, a first plurality of adders, a second plurality of adders, and a plurality of subtractors. The plurality of numeric value inputs are each for receiving a numeric value. The plurality of numeric coefficient inputs each are for receiving a numeric coefficient. The plurality of multiplexers are each controlled by a mode signal and connected to at least one of the plurality of numeric value inputs. The plurality of multipliers are each configured to output the product of one of the numeric coefficients and one of the numeric values. The first plurality of adders are each configured to output a sum of two products output from the plurality of multipliers. The second plurality of adders are each configured to output a sum of one of the numeric values and the sum output by one of the first plurality of adders. The plurality of subtractors are each configured to output the difference of one of the numeric values and the sum output by one of the first plurality of adders.

In yet another aspect, a hardware accelerator comprises a plurality of numeric inputs, a primary logic unit, and a secondary logic unit. The plurality of numeric inputs are for receiving numeric values. The primary logic unit has a first output and a plurality of intermediate outputs, the first output configured to output an FIR value calculated from the numeric values when a mode signal corresponds to an FIR state and to output a first FFT value calculated from the numeric values when the mode signal corresponds to an FFT state, and the plurality of intermediate outputs configured to output intermediate values calculated from the numeric values. The secondary logic unit has a plurality of secondary outputs for outputting secondary FFT values, the secondary logic unit configured calculate the secondary FFT values based on the intermediate values irrespective of the mode signal.

In some embodiments of the hardware accelerator, the primary logic unit further comprises four multipliers, each configured to receive two numeric values and output a product of the two numeric values; two adders, each configured to output a sum of two products, the products output from the multipliers; and a third adder configured to sum the output from the two adders when the mode signal corresponds to the FIR state and output the sum as the FIR value.

In some embodiments, the hardware accelerator further comprises a plurality of registers, wherein the plurality of registers are configured to enable pipelining.

In some embodiments, the hardware accelerator further comprises an encoding selector input configured to provide a signal specifying a numeric encoding mode. In some embodiments, the numeric encoding mode is selectable among at least a floating point number mode and a fixed point number mode.

BRIEF DESCRIPTION OF DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings.

DETAILED DESCRIPTION

The need exists to efficiently calculate both FFT and FIR values. A computing module for an efficient FIR and FFT hardware accelerator is presented to address this need. Such a hardware accelerator may be used in digital signal processors (DSPs) and other types of microprocessors. The hardware accelerator supports an FFT mode and an FIR mode that utilize substantially the same hardware. In some embodiments the FIR hardware is simply a subset of the FFT hardware.

Figure 1:
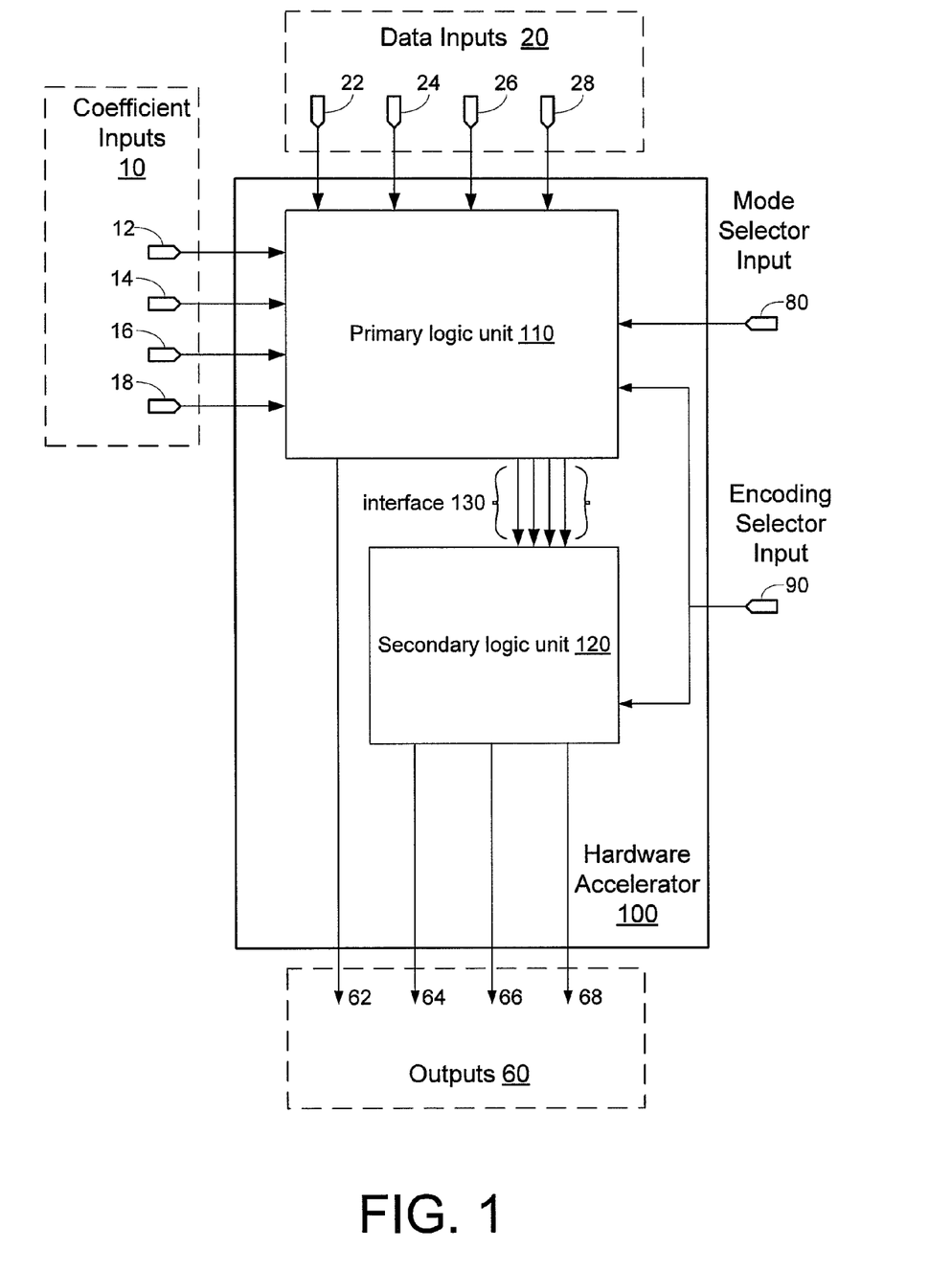
FIG. 1 is a simplified block diagram of an embodiment of the hardware accelerator emphasizing inputs.

An embodiment of a hardware accelerator 100 is shown in FIG. 1. The mode (e.g., FFT or FIR) of the hardware accelerator may be specified, for example, by the state of a signal on mode selector input 80. (For example, the mode select signal may be a binary signal in a high or "1" state to select FIR mode and low or "0" state to select FFT mode, or vice versa.) The hardware accelerator may receive input data from data inputs 20. In some embodiments, data inputs 20 include input 22, input 24, input 26, and input 28. Coefficient data may be received by the hardware accelerator via coefficient inputs 10. In some embodiments, coefficient inputs 10 comprises input 12, input 14, input 16, and input 18. Hardware accelerator 100 produces outputs 60. In some embodiments, outputs 60 include output 62, output 64, output 66, and output 68.

Input data and coefficient data may include numeric values represented in any suitable form. In some embodiments the numerical-representation system is selectable. Encoding selector input 90 may be used to specify the numerical-representation system to hardware accelerator 100. In turn, the interpretation and use of the inputs and outputs depends on the selected numerical representation system.

The hardware accelerator in some embodiments may be viewed as having a primary logic unit 110 and a secondary logic unit 120. The logic units may be operatively connected by an interface 130. The primary logic unit contains all the hardware needed to calculate the desired output in FIR mode. The secondary logic unit contains all the additional hardware needed to calculate additional outputs needed in FFT mode.

The primary logic unit 110 may perform algebraic manipulation of the input data and the coefficient data, and may provide the FIR output data or the first FFT output data, depending on the operating mode, on output 62. Algebraic manipulations may be performed and aided by elements embedded in primary logic unit 110, such as multiplexers, multipliers, adders, subtractors, and the like. The primary logic unit 110 also may provide intermediate data on the intermediate outputs to the secondary logic unit 120 via interface 130.

The secondary logic unit performs algebraic manipulation of the intermediate data and provides second, third and fourth FFT data on output 64, output 66, and output 68, respectively. Algebraic manipulations may be performed and aided by elements embedded in secondary logic unit 120, such as multiplexers, multipliers, adders, subtractors, and the like.

In some embodiments every embedded element of the primary logic unit is required to perform the FIR calculation and every embedded element of the primary and secondary logic units are required to perform the FFT calculation. Stated differently, in some embodiments every element of the primary logic unit is used for every calculation, and every element of the secondary logic unit is used for every FFT calculation. An embodiment of such a hardware accelerator 100 is shown in detail in FIG. 2.

Figure 2:
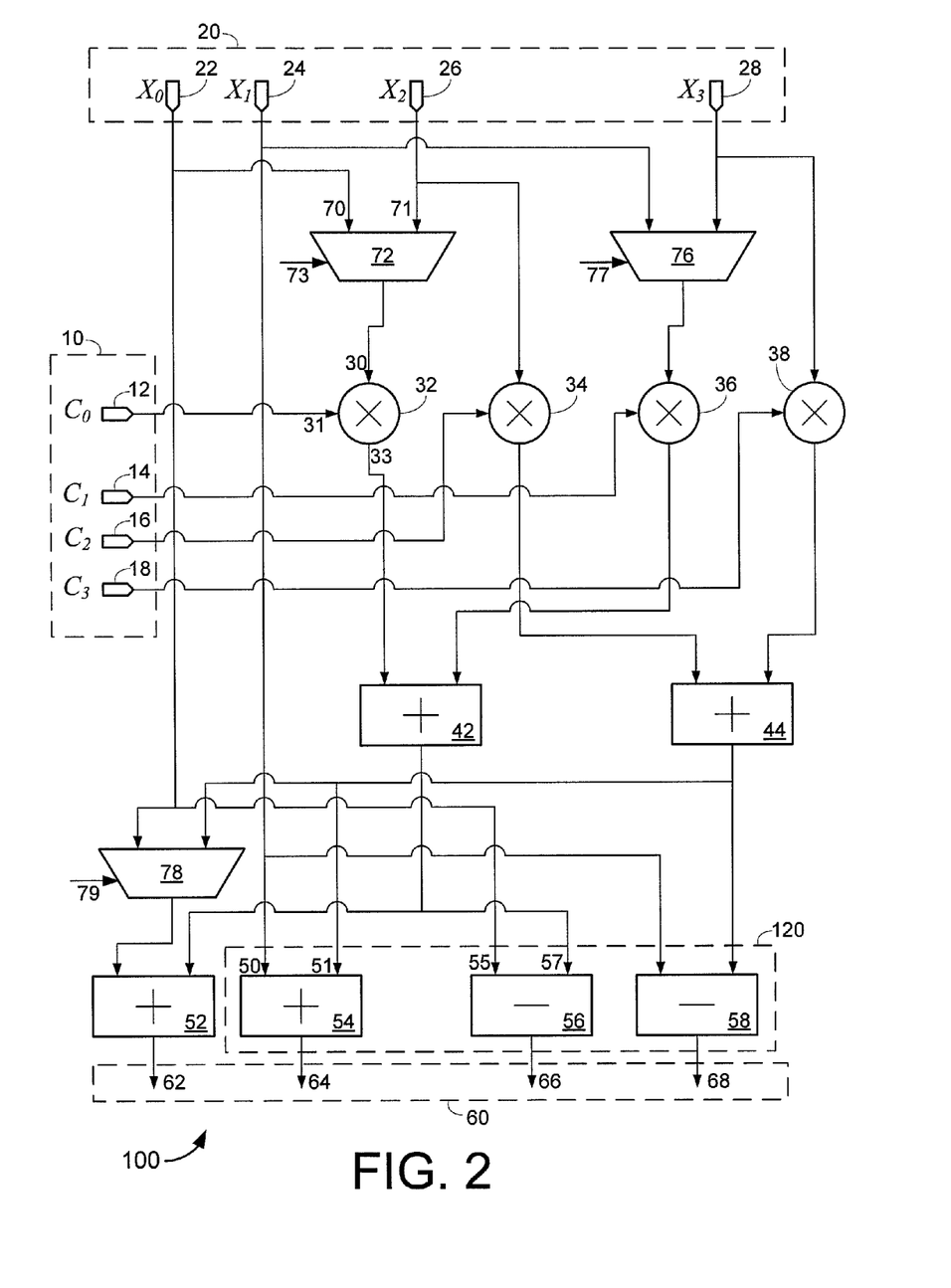
FIG. 2 is a block diagram of an embodiment of the hardware accelerator.

The hardware accelerator 100 includes several different types of elements: multiplexers (MUXs) (e.g., 72), multipliers (e.g., 32), adders (e.g., 42), and subtractors (e.g., 56).

Multiplexers 72, 76, and 78 may select a left input signal or a right input signal according to a control signal and reproduce the selected signal as an output signal. Multipliers 32, 34, 36, and 38 may take a first input signal and a second input signal and produce the product as an output. Adders 42, 44, 52 and 54 may take a first input signal and a second input signal and produce the sum as an output. Finally, subtractors 56 and 58 may take a first input signal and a second input signal, subtract the second from the first, and produce the difference as an output.

The hardware accelerator 100 is capable of FIR calculations and rate-two (also called "radix 2") FFT calculations. Adder 54 and subtractors 56 and 58 form the secondary logic unit 120. The remaining elements form the primary logic unit 110 (unlabelled in FIG. 2). Notice that in the embodiment of FIG. 2, the secondary logic unit 120 does not have a multiplexer and therefore operation may not depend on the mode input by mode selector (FIG. 1).

As an example of multiplexer operation, consider MUX 72. MUX 72 receives input signal from data inputs 22 and 26 which are connected the left to input 70 and right input 71, respectively. Depending on a control signal received at control input 73, MUX 72 reproduces on output 75 either the input signal on left input 79 or the input signal on right input 71. In some embodiments, the control signals received at control inputs 73, 77, and 79, are received from mode selector input 80 (FIG. 1).

As an example of multiplier operation, consider multiplier 32. Multiplier 32 receives input signal from the output of MUX 72 and the coefficient input 12 on inputs 30 and 31, respectively. Multiplication is performed internally and the product is produced on output 33.

As an example of adder operation, consider adder 54. Adder 54 receives data from input 24 and adder 44 on inputs 50 and 51, respectively. Addition is performed internally and the sum is produced on output 64.

As an example of subtractor operation, consider subtractor 56. Subtractor 56 receives data on data inputs 22 and the output of adder 42 as inputs 55 and 57, respectively. Subtraction is performed internally with the data value on input 57 being subtracted from the data value on input 55. The difference is produced as data on output 66.

Those skilled in the art will be aware of appropriate designs for multiplexer, multipliers and the other constituent elements employed in the illustrated embodiments.

Inputs 12, 14, 16, 18, 22, 24, 26, and 28 may each carry a digital signal comprising an arbitrary number of bits. For hardware accelerator 100, inputs 12, 14, 16, 18, 22, 24, 26, and 28 carry signals $C_0$, $C_1$, $C_2$, $C_3$, $X_0$, $X_1$, $X_2$, and $X_3$, respectively. The digital signals include numeric information that may be represented as a floating point number, fixed point number, or by any other suitable numerical-representation system.

In some embodiments, the hardware accelerator 100 is capable of switching between various numerical-representation systems. The numerical-representation system may be specified to hardware accelerator 100 in any suitable way. In some embodiments, a signal received by encoding selector input 90 may specify the numeric-representation system. Each element may be configured to receive information about the numeric-representation system to insure proper calculations. In some embodiments an input and/or coefficient signal may contain information specifying the numerical-representation system. For example, the coefficient signals 10 may be prefaced with a header code specifying the numerical-representation system.

In some embodiments utilizing floating point representation, 24-bit multipliers and adders/subtractors are used. In some embodiments utilizing fixed point representation, 32 bit multipliers and 80 bit adders/subtractors are used. However, the invention and its embodiments are in no way limited by operand size.

FIR Operation

Having described the general functionality of the hardware accelerator 100, an example of operation in the FIR mode is now provided.

In FIR mode the desired data output signal, $O_{62}$, is:

$$O_{62} = C_0 X_0 + C_1 X_1 + C_2 X_2 + C_3 X_3 \qquad 1$$

Here, all symbols represent real numbers. Notice that the desired data output requires four multiplication steps and three addition steps.

Figure 3:
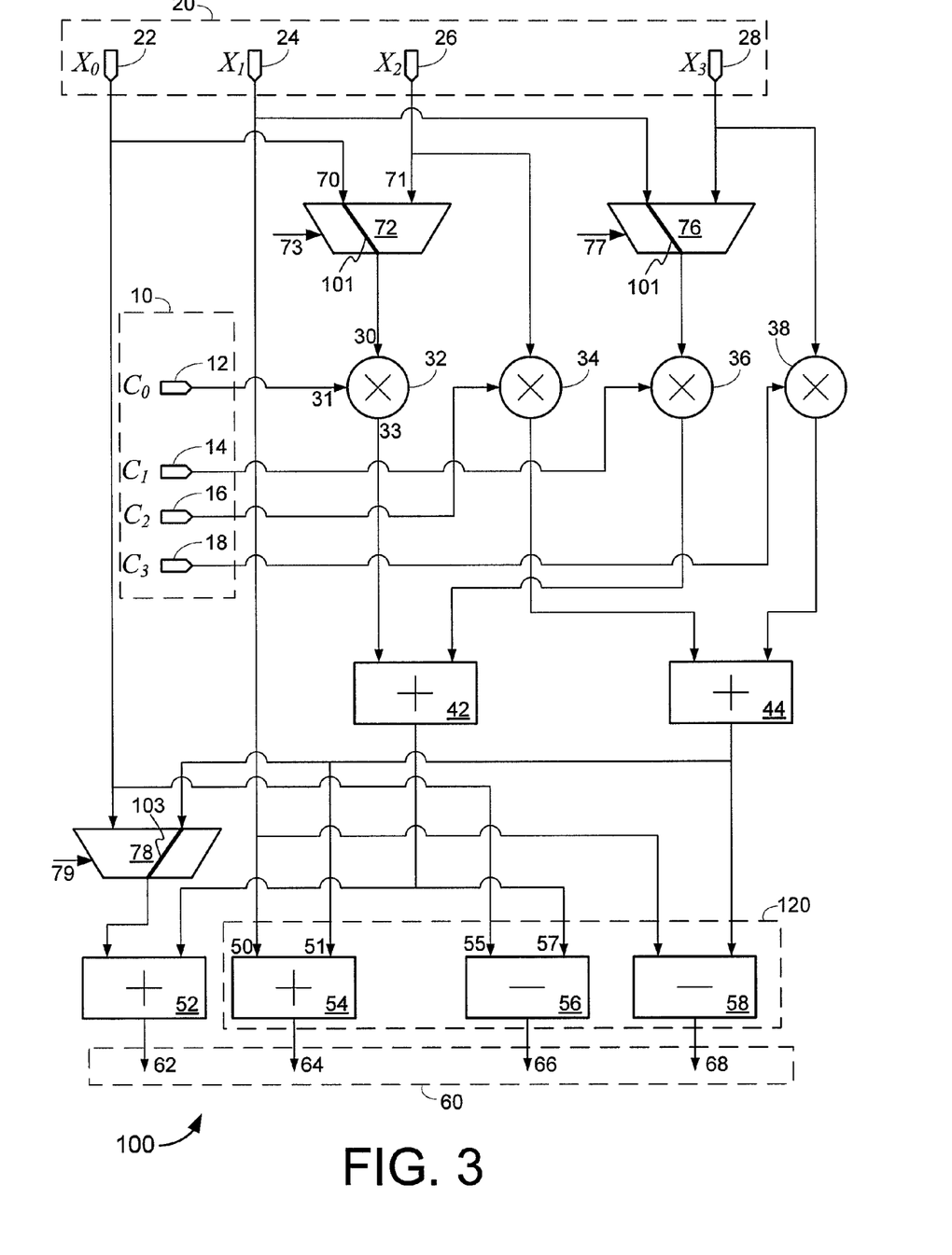
FIG. 3 is the block diagram of embodiment of the hardware accelerator of FIG. 2 configured in the FIR mode.

FIG. 3 shows operation of the hardware accelerator 100 configured in the FIR mode. Data values for $X_0$, $X_1$, $X_2$, and $X_3$ are provided on the data inputs 22, 24, 26, and 28, respectively. Similarly, values for $C_0$, $C_1$, $C_2$, and $C_3$ are provided on the coefficient inputs 12, 14, 16, and 18, respectively. The desired data output signal, $O_{62}$, is produced on output 62. The data output on outputs 64, 66, and 68 may not be needed in FIR mode.

Mode selector input 80 (FIG. 1) provides signals to the control inputs 73 and 77 of MUXs 72 and 76, respectively, that correspond to the selection of the left input. This selection is illustrated as a connecting line 101 between the left input and the output of MUXs 72 and 76 in FIG. 3. MUX 72 passes $X_0$ to multiplier 32, while MUX 76 passes $X_1$ to multiplier 36.

Mode selector input 80 provides a signal to the control input 79 of MUX 78 that corresponds to the selection of the right input; specifically, the output of adder 44. The selection of MUX 78 is illustrated as a connecting line 103 between the right input and the output in FIG. 3.

With the multiplexers in this configuration, the desired data output is produced on output 62. Note that only the elements of the second logic unit 120 (i.e., adder 54 and subtractors 56 and 58), produce unused results. All other elements are used for producing the solution of Eq. 1 as data on output 62.

Hardware accelerator 100 (FIG. 1) may generally support computation of any suitable number of FIR terms. The FIR output signal may be expressed mathematically as $$O_{62} = \sum_{n=0}^{N-1} C_n X_n \qquad 2$$

where $X_n$ and $C_n$ represent data values and coefficient values, respectively, and N is the suitable number of FIR terms. The embodiment of hardware accelerator 100 shown in FIGS. 2 and 3 represents the case where N=4.

FFT Operation

Having provided an example of the operation of the hardware accelerator 100 in FIR mode, an example of the operation in the FFT mode is now provided.

To calculate the rate two FFT, two complex numbers, A and B, are taken as data inputs and a complex number, W, and its conjugate, W*, are taken as the coefficient inputs. The complex data input A has a real part and an imaginary part $A_R$ and $A_I$. To be explicit:

$$A_R = \text{Re}\{A\} = X_0$$

$$A_I = \text{Im}\{A\} = X_1 \qquad 2$$

Similarly $B_R$ and $B_I$ are defined in terms of B:

$$B_R = \text{Re}\{B\} = X_2$$

$$B_I = \text{Im}\{B\} = X_3 \qquad 3$$

Finally, $W_R$ and $W_I$ are defined in terms of W:

$$W_R = \text{Re}\{W\} = C_0 = C_3$$

$$W_I = \text{Im}\{W\} = -C_1 = C_2 \qquad 4$$

The signals are related to the signal labels as they will be input to the hardware accelerator 100.

The desired outputs of the rate-two FFT are A+WB and A−WB. These are both complex numbers, which may be represented by four real numbers. The four data outputs for the FFT calculation are:

$$O_{62} = A_R + B_R W_R - B_I W_I \qquad 5$$

$$O_{64} = A_I + B_R W_I + B_I W_R \qquad 6$$

$$O_{66} = A_R - (B_R W_R - B_I W_I) \qquad 7$$

$$O_{68} = A_I - (B_R W_I + B_I W_R) \qquad 8$$

$O_{62}$ and $O_{64}$ are the real and imaginary parts, respectively, of A+WB, and $O_{66}$ and $O_{68}$ are the real and imaginary parts, respectively, of A−WB.

Figure 4:
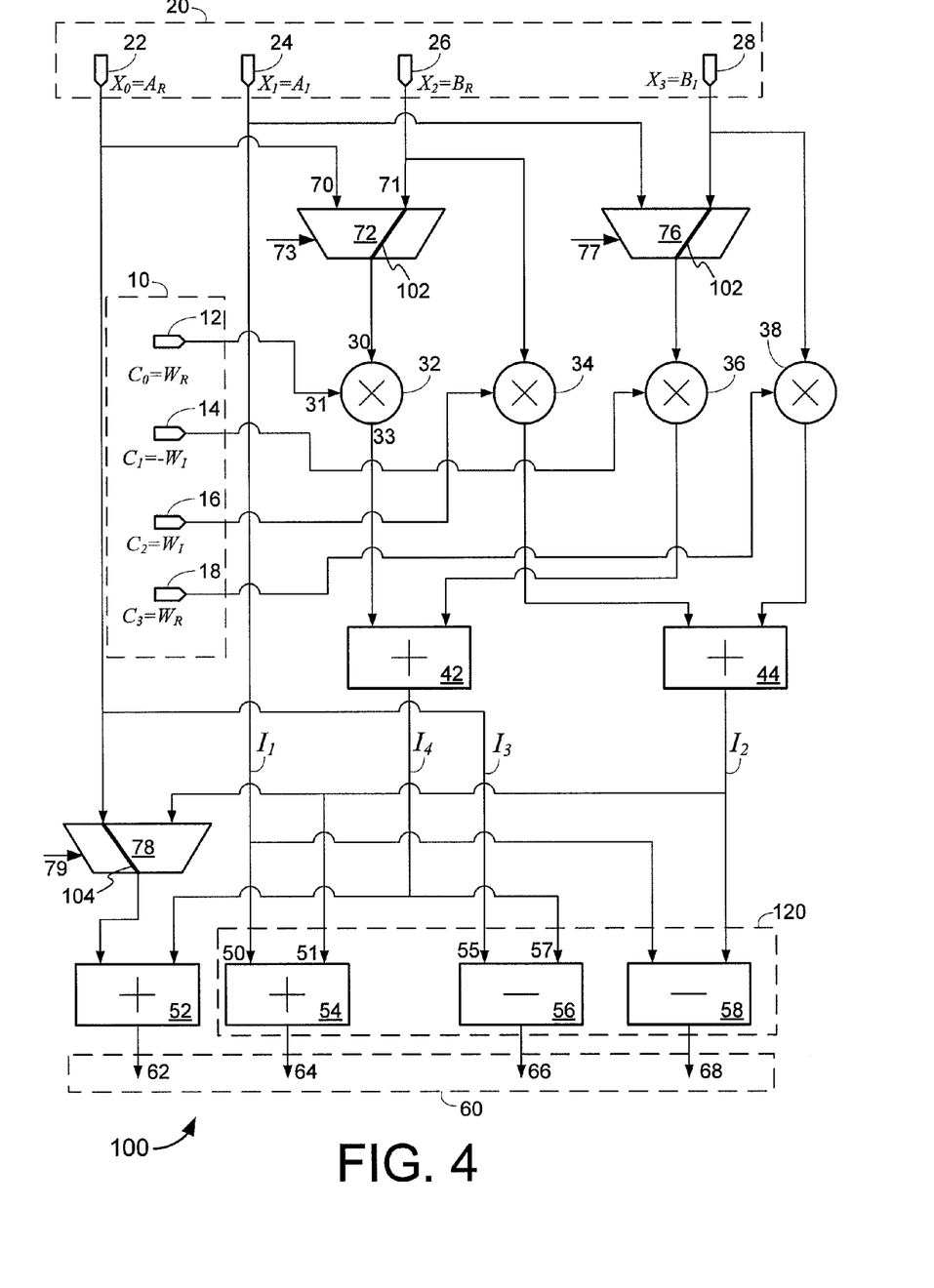
FIG. 4 is the block diagram of embodiment of the hardware accelerator of FIG. 2 configured in the FFT mode.

FIG. 4 shows an example configuration of the hardware accelerator 100 in FFT mode. The real and imaginary parts of A are written on input 22 ($X_0 = A_R$) and input 24 ($X_1 = A_I$), respectively. The real and imaginary parts of B are written on input 26 ($X_2 = B_R$) and input 28 ($X_3 = B_I$), respectively. $W_R$ is written on inputs 12 ($C_0 = W_R$) and 18 ($C_3 = W_R$), while $W_I$ and $-W_I$ are written on inputs 14 ($C_2 = W_I$) and 16 ($C_1 = -W_I$), respectively. MUXs 72 and 76 are both in a state that corresponds to the selection of the right input as shown by connecting lines 102. MUX 78 is in a state that corresponds to the selection of the left input as shown by connecting line 104.

The primary logic unit produces output $O_{62}$ and the intermediate values $I_1$, $I_2$, $I_3$, and $I_4$. The intermediate values are related to the input values:

$$I_1 = X_1 = A_I \qquad 9$$

$$I_2 = C_2 X_2 + C_3 X_3 = B_R W_I + B_I W_R \qquad 10$$

$$I_3 = X_0 = A_R \qquad 11$$

$$I_4 = C_0 X_2 + C_1 X_3 = B_R W_R - B_I W_I \qquad 12$$

Secondary logic unit combines the intermediate values to produce outputs $O_{64}$, $O_{66}$, and $O_{68}$:

$$O_{64} = I_1 + I_2 \qquad 13$$

$$O_{66} = I_3 - I_4 \qquad 14$$

$$O_{68} = I_1 - I_2 \qquad 15$$

It is a simple matter to verify that the configuration of hardware accelerator 100 in FIG. 4 produces signals $O_{62}$, $O_{64}$, $O_{66}$, and $O_{68}$ on outputs 62, 64, 66, and 68, respectively.

Additional Embodiments

Various further embodiments of the hardware accelerator are envisioned.

Figure 5:
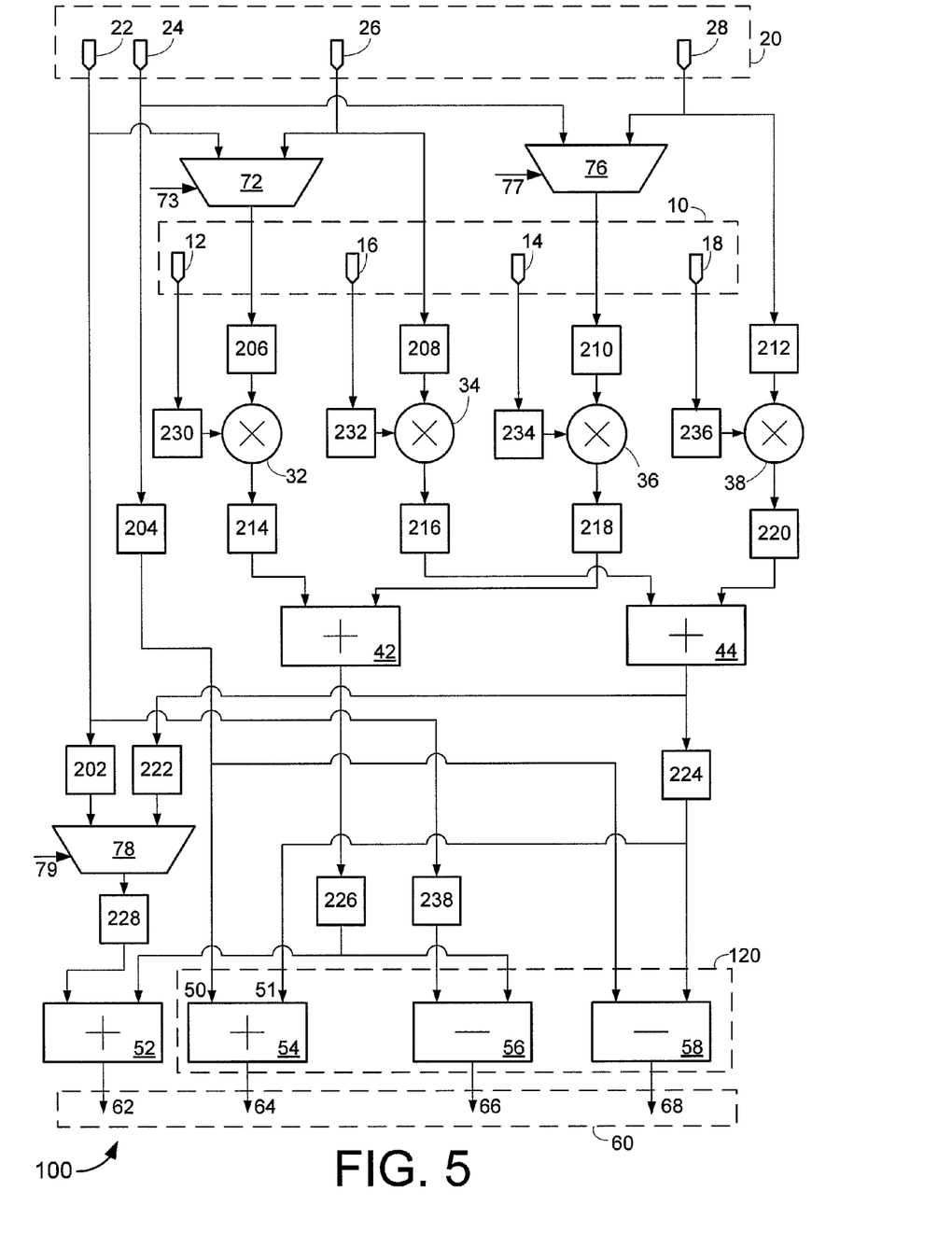
FIG. 5 is a block diagram of an embodiment of the hardware accelerator capable of pipelining.

Some embodiments support instruction pipelining. Pipelining may allow the overall throughput of the hardware accelerator to be increased. An embodiment supporting pipelining is shown in FIG. 5, where the hardware accelerator 200 includes registers 202 to 238.

With pipelining, new data may be written at a rate equal to the slowest component in the hardware accelerator 100, provided sufficient memory is available. By providing memory at each stage of execution, the data being input on inputs 22, 24, 26, and 28, can be several calculations upstream of data being delivered via outputs 62, 64, 66, and 68. Here each input group e.g., $X_0$, $X_1$, $X_2$, $X_3$, $C_0$, $C_1$, $C_2$, and $C_3$, for FIR, as a data set.

Each register (202 to 238), has an appropriate amount of memory capacity to insure that each data set may stay synchronized, and that adders, subtractors and multipliers are operating on data within the same set. The time required for each component and the desired throughput may be used in determining the register configuration.

For example, in some embodiments register 204 stores more data than register 224. A number of data values may cue up in register 204 before data from the same data set reaches register 224. Once each of registers 204, 224, 226, 228, and 238 each have data from the same data set, the operation of adders 52 and 54, and subtractors 56 and 58, may be performed.

In some embodiments, the secondary logic unit operates independently of the mode; the data output from the secondary logic unit in FIR mode may not provide a solution to the FIR algorithm.

In some embodiments, the secondary logic unit 120 is disabled in the FIR mode.

In some embodiments, the hardware accelerator is implemented in CMOS technology.

In some embodiments, the input connections of MUX 78 are switched such that in FIR mode the left input of all the multiplexers is selected and in FFT mode, the right input of all the multiplexers is selected.

Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A hardware accelerator comprising:
a mode selector input for providing a mode signal;
a plurality of data inputs for receiving numeric data values, the plurality of data inputs comprising a first, second, third, and fourth data input;
a plurality of coefficient inputs for receiving numeric coefficient values, the plurality of coefficient inputs comprising a first, second, third, and fourth coefficient input;
a first multiplexer having a first multiplexer output for providing the numeric data value received from the first data input when the mode signal is in a first state, and the numeric data value received from the third data input when the mode signal is in a second state;
a second multiplexer having a second multiplexer output for providing the numeric data value received from the second data input when the mode signal is in the first state, and the numeric data value received from the fourth data input when the mode signal is in the second state;
a first multiplier having a first multiplier output for providing a first product, the first product being the product of the numeric coefficient value received from the first coefficient input and the numeric data value received from the first multiplexer output;
a second multiplier having a second multiplier output for providing a second product, the second product being the product of the numeric coefficient value received from the third coefficient input and the numeric data value received from the third data input;
a third multiplier having a third multiplier output for providing a third product, the third product being the product of the numeric coefficient value received from the second coefficient input and the numeric data value received from the second multiplexer output;
a fourth multiplier having a fourth multiplier output for providing a fourth product, the fourth product being the product of the numeric coefficient value received from the fourth coefficient input and the numeric data value received from the fourth data input;
a first adder having a first adder output for providing a first sum, the first sum being the sum of the first product received from the first multiplier and the third product received from the third multiplier;
a second adder having a second adder output for providing a second sum, the second sum being the sum of the second product received from the second multiplier and the fourth product received from the fourth multiplier;
a third multiplexer having a third multiplexer output for providing a third multiplexer output data, the third multiplexer output data being the second sum received from the second adder when the mode signal is in the first state, and the numeric data value received from the first data input when the mode signal is in the second state;
a third adder having a first output for providing a first output data, the first output data being the sum of the third multiplexer output data received from the third multiplexer and the first sum received from the first adder;
a fourth adder having a second output for providing a second output data, the second output data being the sum of the numeric data value received by the second data input and the second sum received from the second adder;
a first subtractor having a third output for providing a third output data, the third output data being the difference of the numeric data value received by the first data input and the first sum received from the first adder; and
a second subtractor having a fourth output for providing a fourth output data, the fourth output data being the difference of the numeric data value received by the second data input and the second sum received from the second adder.

2. The hardware accelerator of claim 1, further comprising a plurality of registers, wherein the plurality of registers are configured to enable pipelining.

3. The hardware accelerator of claim 1, further comprising an encoding selector input configured to provide a signal specifying a numeric encoding mode.

4. The hardware accelerator of claim 3, wherein the numeric encoding mode is selectable among at least a floating point number mode and a fixed point number mode.

5. The hardware accelerator of claim 1, wherein the first and second multiplexers, first, second, third, and fourth multipliers, and first, second, and third adders comprise a primary logic unit and wherein the fourth adder and first and second subtractors comprise a secondary logic unit.

6. The hardware accelerator of claim 1, wherein the numeric data values comprise n−1 data values $X_0, X_1, \ldots, X_{n-1}$ and the numeric coefficient values comprise n−1 coefficient values $C_0, C_1, \ldots, C_{n-1}$, where n is a positive integer, and wherein the first output data is computed in accordance with the algebraic expression $C_0X_0+C_1X_1+C_2X_2+\ldots+C_{n-1}X_{n-1}$.

7. The hardware accelerator of claim 1, wherein the numeric data values comprise n−1 data values $X_0, X_1, \ldots, X_{n-1}$ and the numeric coefficient values comprise n−1 coefficient values $C_0, C_1, \ldots, C_{n-1}$, where n is a positive integer, and wherein the first output data is computed in accordance with the algebraic expression $X_0+C_0X_2+C_1X_3$.

8. The hardware accelerator of claim 1, wherein the numeric data values comprise n−1 data values $X_0, X_1, \ldots, X_{n-1}$ and the numeric coefficient values comprise n−1 coefficient values $C_0, C_1, \ldots, C_{n-1}$, where n is a positive integer, and wherein the second output data is computed in accordance with the algebraic expression $X_1+C_2X_2+C_3X_3$.

9. The hardware accelerator of claim 1, wherein the numeric data values comprise n−1 data values $X_0, X_1, \ldots, X_{n-1}$ and the numeric coefficient values comprise n−1 coefficient values $C_0, C_1, \ldots, C_{n-1}$, where n is a positive integer, and wherein the third output data is computed in accordance with the algebraic expression $X_0-(C_0X_2+C_1X_3)$.

10. The hardware accelerator of claim 1, wherein the numeric data values comprise n−1 data values $X_0, X_1, \ldots, X_{n-1}$ and the numeric coefficient values comprise n−1 coefficient values $C_0, C_1, \ldots, C_{n-1}$, where n is a positive integer, and wherein the third output data is computed in accordance with the algebraic expression $X_1-(C_2X_2+C_3X_3)$.

* * * * *